3,429,808
METHOD OF TREATING A FILTER BED
Warren H. Smith, Rte. 1, Chaska, Minn. 55318
No Drawing. Filed June 28, 1967, Ser. No. 649,494
U.S. Cl. 210—35      8 Claims
Int. Cl. C02b *1/26;* B01d *37/00*

ABSTRACT OF THE DISCLOSURE

Disclosed herein is an improved method of increasing the effectiveness of a water treatment filter bed of activated carbon by conditioning the bed with a backwash of very dilute available chlorine in order to enable the same to more effectively eliminate iron from the water that is passed therethrough during its normal usage. The available chlorine attaches to the particles of activated carbon so that when water is subsequently passed therethrough, the chlorine converts the iron that is in the ferrous state to the ferric state which is precipitated by the carbon and consequently separated out by the bed. As a consequence, a more effective separation of iron from the water that is treated is accomplished and, in addition, odors are removed from the water and an effective bacteria control is provided. The bed is treated with an alkaline rather than acidic solution, the particular chemical which is used being sodium hypochlorite.

---

The primary object of my invention is to provide a novel and improved method of conditioning a water treatment filter bed so that it will eliminate iron present in the water in the ferrous as well as the ferric state.

A more specific object is to provide a novel method of increasing the effectiveness of a water treatment filter bed of activated carbon so as to condition it to remove dissolved ferrous iron as well as iron in the ferric state, to remove odors from the water, and to control the growth of bacteria therein.

A still more specific object of my invention is to increase the effectiveness of a water treatment filter bed of activated carbon for the removal of iron from water to be passed therethrough by backwashing the filter bed with a very dilute aqueous solution of available chlorine with a sufficient backwash flow to thoroughly loosen the bed and bring each particle thereof into contact with the available chlorine so that the latter may be retained thereby to subsequently convert dissolved ferrous iron to the ferric state for precipitation and separation by the bed and to remove odors and control bacterial growth in the water being treated.

These and other objects and advantages of my invention will more fully appear to those skilled in the art in view of this disclosure.

It is somewhat conventional to utilize a bed of activated carbon in the treatment of water to separate iron contained in the water as it is passed through the bed because it has been recognized that the carbon will cause the iron which is in the dissolved ferric state to precipitate and consequently be separated out from the water as the water moves through the bed. It has been found, however, that even after water has been treated by such a bed, the housewife sometimes and particularly in certain areas encounters rust stains and the like despite the fact that the water has been so treated. This is the result of dissolved iron in the ferrous state which is not precipitated by an ordinary activated carbon bed and consequently passes through the bed. Also, since carbon is fairly limited in its ability to absorb odors, such water will frequently contain odors even after it is passed through the activated carbon bed and, upon standing, relatively free growth of bacteria will result. This makes the water particularly undesirable when viewed from each of these aspects. I have discovered that each of these problems can be effectively controlled and substantially eliminated through a new method of treating the activated carbon bed.

The conventional method of treating a filtering bed with a chemical to effect the desired result is to hit the bed with a downflow of a concentrated solution of a chemical. In other words, the concentrated solution is forced through the bed from above in the same direction that the water normally passes during the water treating operation. Such treatment is normally preceded with a backwash of plain water to remove any impurities which have previously been collected during a filtering operation but the actual treatment of the bed subsequent to the removal of such collected impurities has been conventionally accomplished by forcing the chemical downwardly through the bed in the direction in which the water normally passes therethrough. I have attempted to treat filter beds in this manner with chlorine but the use of chlorine in the conventional method has been found to provide a nonacceptable effect and that such a bed will pass objectionable amounts of iron through the bed immediately and continuously after being treated. The reasons for this are not understood completely but it may be that not all of the bed retains the available chlorine or there may be channeling or some other phenomena may take place which is not understood but in any event the use of chlorine in this manner for the separation of iron from water, particularly in the home, has not been acceptable. The theory apparently in the past has been to hit the bed hard with a relatively high concentration in order to obtain the best results and to save time.

It has been recognized in the past that when a bed of activated carbon is transferred from one location to another and is subjected to the normal conditioning of merely backwashing with water to eleminate the precipitated iron, the bed will pass objectionable amounts of iron in the ferric state in the new location until the bed has been able to adjust itself to the new location conditions. Thereafter it may satisfactorily precipitate and remove the dissolved iron in the ferric state but it will not remove the dissolved ferrous iron since the latter is not normally precipitated by an activated carbon bed under normal conditions.

I have discovered a method of greatly increasing the efficiency of a water treatment bed of activated carbon by first backwashing the bed in the normal manner with a backwash of water to remove the precipitated iron and other impurities which were separated out during the previous use of the bed and then following such backwash with a second backwash of a very dilute solution of available chlorine. I have found that this method substantially increases the effectiveness of such a water treatment filter bed for it precipitates out the iron in the ferrous state as well as that in the ferric state and consequently the undersirable rust stains, etc. will not be experienced by the housewife when the activated carbon bed has been so treated. In addition to precipitating and separating out the ferrous iron, the bed after being so treated with a dilute solution of available chlorine does a remarkably effective job of removing odors from the water and effectively controls the growth of bacteria in the water. These features have long been recognized as desirable in a water treatment unit but the solution of the problem has heretofore been considered generally unsatisfactory, particularly in the home water softener units in connection with which my invention is particularly well suited.

I have found that a very dilute solution of available chlorine is much more effective in the treatment of such a filter bed of activated carbon than a concentrated solution and I have found that the use of such a solution as a backwash is much more effective than if used in the conventional downflow treatment. I have found that the backwash treatment provides a much more uniform bed and consequently the bed will more effectively remove iron and other impurities from the water that is subsequently passed therethrough. I have also found that the relatively weak solution does not have the undesirable oxidizing effects upon the individual particles of carbon that is characteristic of the concentrated solution. Apparently the very dilute solution either does not oxidate the carbon or the reaction is so slow as to not be an important factor for there is no noticeable breaking down of the carbon particles and consequent loss of a substantial portion of the bed upon the initial backwash.

The exact nature of the phenomena which takes place as a result of the backwash with a very weak dilute solution of available chlorine is not completely understood. It may be that there is a loose chemical attachment of the available chlorine in which the chlorine is available for reaction with iron in the dissolved ferrous state. On the other hand, it may be a mere physical attachment and I am inclined to believe that the latter is more likely so that upon coming in contact with the iron in its ferrous state it is readily available for reaction therewith to convert the iron. In any event, I have found that a bed treated in this manner is substantially more effective in removing ferrous iron, controlling the growth of bacteria, and removing odors from the water. As a consequence, the water which has passed through such a bed has no adverse taste or odor. In addition, an advantage of such treatment is that it avoids premature dissipation of the carbon bed. In this connection, it will be noted that I prefer to use an alkaline instead of an acidic solution in the treatment of the bed.

It will be noted that the backwash chlorinated standardizes the bed in that it makes the permeability more uniform throughout. The backwash flow loosens the bed so that all particles of the carbon contact available chlorine. I utilize a sufficiently strong backflow to loosen the bed throughout and keep the carbon particles in suspension without losing an appreciable amount so as to separate only the very fines which is desirable to remove. When the backwash with dilute available chlorine is completed, the bed is uniform throughout in its condition and capacity for the treatment of water and the bed will be in a much better condition than if treated with the same amount of chlorine and the same concentrations in a downflow treatment.

I prefer to utilize cocoanut charcoal because of its high density so that I can utilize a fairly rapid penetration of backwash flow without losing any appreciable amount of particles of the bed. Of course, activated carbon having a lesser density may be utilized and in that event the rate of backflow must be reduced so as to avoid losing any substantial portion of the particles. I prefer to utilize a sufficient backflow to provide about a 30% expansion in the volume of the bed although a higher percentage of expansion up to 100% may be utilized. During such backwash treatment, the upper levels loosen first and thereafter the lower levels will also loosen and before the backwash treatment is completed, all of the particles will be subjected to the available chlorine uniformly and an equilibrium will be reached whereunder the carbon ceases to retain an appreciable percentage of the available chlorine from the solution or, stated otherwise, until substantially the entire outer surface of the carbon particles has absorbed and retained available chlorine on the outer layer of the particle. Thus the outer layer of the carbon particles will be in equilibrium with the available chlorine in the solution passing thereby.

The rate of flow of the backwash should be such that the upward velocity of the very dilute available chlorine solution should not exceed the settling velocity of the finest particles of the bed which are desired to be retained. In the normal usage, a very few particles will break down into fines and it is desirable to wash these out but in general no substantial amount of the carbon particles will be lost and if this velocity of flow is not exceeded, the particles of the desired size will remain in the bed.

As indicated above, a dilute aqueous solution of available chlorine effectively improves the functions of the bed when utilized as a backwash. Wherever herein I have utilized the term "dilute aqueous solution" or "very dilute aqueous solution" I am referring to a concentration of 20-25,000 parts per million.

As an example of one embodiment of my invention, I utilize this method by treating a filter bed of cocoanut charcoal with a backwash of water to first remove at least the major portion of the impurities which have been collected within the bed during the previous water treatment cycle. Thereafter, I backwash the filter bed further for approximately ten minutes with an aqueous solution of approximately .05% sodium hypochlorite (NaOCl) at a rate of approximately 12 gallons per square foot of bed per minute. After ten minutes of such backwashing, the bed is charged and ready for the treatment of water to effectively remove iron in its ferric as well as ferrous state and to remove odors and control the growth of bacteria in the water which passes therethrough. The rate of backflow which I have selected is ample to loosen the bed thoroughly and bring the individual particles of charcoal carbon into contact with the available chlorine so that it may be retained at the outer surface of the particles of carbon and held there available for reaction with the dissolved ferrous iron to convert the same. The rate of flow of backwash may extend over a range of 3-15 gallons per square foot per minute, depending upon the density of the activated carbon which is utilized in the bed, the lower the density of carbon, the lower the rate of flow to be utilized. The preferred range of backwash is 8-15 gallons per square foot per minute and, as indicated, the preferred rate if a bed of cocoanut charcoal is utilized is 12 gallons per square foot of bed per minute.

For satisfactory results without necessity of unduly frequent recharging or treatment of the bed, I utilize 40-320 grams of available chlorine per cubic foot of activated carbon contained in the bed. The preferred range is 80-160 grams of available chlorine per cubic foot of activated carbon contained in the bed and the preferred level is at approximately 160 grams of available chlorine per cubic foot of activated carbon. I have found, however, that I obtain improved results with even relatively small amounts of available chlorine. In fact, my tests indicate that a backwash of any amount of available chlorine affords an improved result. I have found, for example, that when adding as little as 4-16 grams of available chlorine, I get improved results in that it takes in excess of seven days for a breakthrough of 0.4 p.p.m. of iron at a flow rate of 5 gallons per minute. Since the stain level is at 0.2-0.4 p.p.m. of iron, it will be seen that the improved results can be assured for a period as long as seven days through the addition of even such small amounts as 4-16 grams of available chlorine per cubic foot of activated carbon bed in the backwash thereof.

Anyone skilled in the art will readily appreciate and visualize the manner in which the available chlorine may be added to the backwash. I have used the venturi method to draw chlorine from a feed tank connected to the water line through which the backwash is accomplished so that the venturi action will draw the sodium hypochlorite into the flow of water at a rate which I set with a needle valve to provide the desired concentration. If desired, the pressure differential method may also be utilized wherein the available chlorine solution may be contained within a collapsible container and gradually forced into the flow of water as it is forced in the backwash direction through the bed of activated carbon. Either of these two methods or some other equally suitable method as is well-known in the art may be utilized for the introduction of the available chlorine into the backwash water to provide the desired concentration in accordance with those set forth above.

In view of the above, it will be seen that I have provided a simple, novel, and inexpensive method of providing substantial benefits to a water treatment bed through the simple expediency of subjecting the bed to a backwash flow of a dilute solution of available chlorine whereby the bed will provide over an extended period thereafter, improved iron separation characteristics as well as odor-removing and bacteria control features. A bed so treated will effectively eliminate stains which may otherwise occur from the presence of dissolved ferrous iron in the water and will effectively eliminate odors and will control the growth of bacteria even though the water is not promptly used after entering the filter bed. The chlorine which is held in releasable form by the particles of carbon is released as required until all or substantially all of the available chlorine has been utilized in the conversion of ferrous iron or in the oxidation of organic impurities. When the available chlorine has been consumed and the level of ferrous iron rises above 0.4 p.p.m. or the bed becomes clogged with precipitated iron, whichever occurs first, then the bed is again first backwashed with water and subsequently backwashed with a dilute solution of available chlorine as hereinbefore defined to again recharge the bed. It will be understood, of course, that if desired the backwash with untreated water may be eliminated and the backwash operation may be commenced with a dilute solution of available chlorine. Of course, in that event, a greater volume of the solution of available chlorine will undoubtedly be utilized for the initial flow will be required to physically loosen and wash away the precipitated iron and other impurities which were collected by the bed during the previous water treatment operation.

It will, of course, be understood that various changes may be made in the form, details, arrangement and proportions of the parts without departing from the scope of my invention which consists of the matter shown and described herein and set forth in the appended claims.

What is claimed is:

1. A method of increasing the effectiveness of a filter bed of activated cocoanut charcoal for the removal of iron from water to be passed therethrough consisting of:
   (a) backwashing the filter bed with water to remove at least the major portion of impurities collected within the bed, and
   (b) then backwashing the filter bed further for approximately ten minutes with an aqueous solution of approximately .05% NaOCl at a rate of approximately 12 gallons per suare foot or bed per minute, the rate of flow of backwash being sufficient to provide an expansion in volume of the bed of at least 30%.

2. A method of increasing the effectiveness of a filter bed of activated cocoanut charcoal for the removal of iron from water to be passed therethrough consisting of:
   (a) backwashing the filter bed with water to remove at least the major portion of impurities previously collected within the bed, and
   (b) then backwashing the filter bed further with a very dilute solution of about 80–160 grams of available chlorine per cubic foot of activated carbon at a rate of flow of backwash sufficient to provide an expansion in volume of the bed of about 30–100%.

3. A method of increasing the effectiveness of a water treatment filter bed of activated carbon for the removal of iron from water to be passed therethrough consisting of:
   (a) first backwashing the filter bed with water to remove the major portion of impurities previously collected within the bed, and
   (b) then backwashing the filter bed with a very dilute aqueous solution for about 10 minutes of available chlorine containing approximately 40–320 grams of available chlorine per cubic foot of activated carbon contained in the bed, the rate of flow of backwash being sufficient to provide an expansion in volume of the bed of at least 30%.

4. The method defined in claim 3 wherein the dilute aqueous solution of available chlorine contains approximately 160 grams of available chlorine per cubic foot of activiated carbon contained in the bed.

5. The method defined in claim 3 wherein the dilute aqueous solution of available chlorine contains approximately 80–320 grams of available chlorine per cubic foot of activated carbon contained in the bed.

6. The method defined in claim 3 wherein the dilute aqueous solution of available chlorine contains approximately 80–160 grams of available chlorine per cubic foot of activated carbon contained in the bed.

7. A method of increasing the effectiveness of a filter bed of activated carbon for the removal of iron from water to be passed therethrough consisting of backwashing the filter bed with a very dilute aqueous solution of available chlorine containing approximately 40–320 grams of available chlorine per cubic foot of activated carbon contained in the bed, the rate of backwash flow being sufficient to produce expansion in volume of the bed in excess of approximately 30%.

8. A method of increasing the effectiveness of a filter bed of activated carbon for the removal of iron from water to be passed therethrough consisting of backwashing the filter bed with a very dilute aqueous solution of available chlorine containing approximately 40–320 grams of available chlorine per cubic foot of activated carbon contained in the bed, the rate of backwash flow being sufficient to produce an expansion in volume of approximately 30–100%.

References Cited

UNITED STATES PATENTS 2,029,962  2/1936  Urbain et al. _____ 210—40 X

SAMIH N. ZAHARNA, *Primary Examiner.*

U.S. Cl. X.R.

210—39